Patented Dec. 28, 1937

2,103,804

UNITED STATES PATENT OFFICE 2,103,804

AZO DYESTUFFS AND PROCESS FOR THEIR MANUFACTURE

Walter Wehrli, Basel, Switzerland, assignor to the firm of Chemical Works formerly Sandoz, Basel, Switzerland No Drawing. Application July 22, 1935, Serial No. 32,671. In Germany July 28, 1934

15 Claims.  (Cl. 260—92)

The present invention relates to new azo dyestuffs and to a process for their manufacture.

It has been found that new azo dyestuffs capable of forming complex metal compounds on after-treatment with metal yielding agents can be prepared by coupling a diazo compound prepared from an amine of the aromatic series and containing in the ortho position to the diazotizable amino group at least one group of the general formula

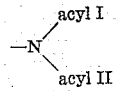

wherein acyl I represents sulphoalkyl, sulphoaryl and sulphoaralkyl and acyl II represents an organic acyl radical, with a coupling component or an azo dyestuff capable of coupling, and by subjecting the azo dyestuff thus obtained to a treatment with saponifying agents in order to split off the acyl group II. In this manner azo dyestuffs will be obtained which possess the general formula

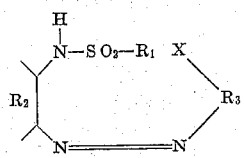

wherein $R_1$ represents alkyl, aryl and aralkyl, $R_2$ represents a radical of an aromatic amine, $R_3$ represents a radical of an aromatic, heterocyclic or aliphatic compound and X represents a group contiguous to the azo group and selected from the class consisting of hydroxy, alkoxy, carboxy, amino, alkylamino, aralkylamino and arylamino groups.

The azo-dyestuffs prepared by the present process can like the respective o-hydroxy-azo dyestuffs be afterchromed on the fibre, whereby the shade becomes deeper and the properties become improved. By treating the new dyestuffs in substance with compounds yielding chromium, copper or other suitable metals, they bind the metal in complex form and give water-soluble or insoluble metal-containing dyestuffs that can be used for various purposes, for example for dyeing textiles or leather or for the manufacture of lakes and varnishes.

The diazo compounds which can be used in the present process are prepared in the usual manner from amines of the general formula

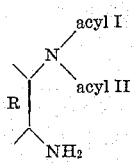

wherein R represents an aromatic nucleus, which may contain substituents such as halogen, alkyl, sulpho, nitro, hydroxy, carboxy, alkoxy, alkylamino, acylamino, arylamino, aralkylamino groups. The diacylated amino group may contain identical or different acyl groups, whereby acyl I must be a radical of an alkylsulphonic acid, such as methane sulphonic acid, ethane sulphonic acid etc., or of an aryl sulphonic acid such as benzene sulphonic acid, toluene sulphonic acid, naphthalene sulphonic acid, etc., which may be substituted in the aryl nucleus and contain groups such as halogen, nitro, acylamino, alkylamino, hydroxy, alkoxy, carboxy etc., or of an aralkylsulphonic acid such as benzylsulphonic acid or its derivatives. The acyl group II may be one of the above cited radicals or be derived from an organic carboxylic acid such as acetic acid, formic acid, benzoic acid, naphthoic acid, oxalic acid etc.

The diazotization of the o-aminodiacylamino-derivatives is carried out in the usual manner, and the diazo compounds obtained are coupled in an alkaline, neutral or acid medium with such compounds of the aliphatic, aromatic or heterocyclic series that contain at least one hydroxy, alkoxy, carboxy, amino, alkylamino, aralkylamino or arylamino group and are able to couple with the diazo compounds in an ortho-position to one of the groups listed above.

Such compounds are for example the derivatives of the aceto acetic acid, hydroxy-, alkoxy-, amino- and amino-hydroxy compounds of the benzene, naphthalene, anthracene and carbazol series, their sulphonic and carboxylic acids and their halogenated, nitrated, alkylated and hydroxalkylated derivatives.

It is further possible to use coupling-components such as azo dyestuffs containing a hydroxy, alkoxy, carboxy, amino, alkylated, aralkylated or acylated amino group and which couple with diazo compounds in ortho-position to the above listed groups.

Instead of coupling the diazo compound prepared from an o-amino-diacylamino compound with an already prepared azo dyestuff, it is also possible to first couple the said diazo compound with such a coupling component that is able to copulate several times and to combine the intermediate monoazo dyestuff thus obtained with any diazo compound in order to produce a polyazo dyestuff. Such polyazo dyestuffs can also be transformed into their complex metal compounds by the known processes.

The elimination of the acyl rest II from the mono- or polyazo dyestuffs prepared according to the processes described above, occurs very easily on treatment with saponifying agents, without influence on the acyl rest I. If the formation of the dyestuff has been carried out in a carbonate alkaline medium, it is generally sufficient to heat it for a certain time with the mother liquor in order to obtain a complete splitting of the acyl group II. By heating the diacylamino dyestuffs before or after their isolation with a diluted caustic soda lye, the saponification and elimination of the acyl rest II occurs very rapidly.

The dyestuffs prepared according to the present invention are isolated from the reaction medium in which they have been prepared by the usual methods, say by salting them out or by precipitating them from their solutions by means of acids.

As the present invention allows to prepare a great number of different dyestuffs, their coloration in dry state may vary from yellow to dark shades. They can be used for various purposes and dye textile fibres of cellulosic or animal origin yellow to black shades.

One object of the present invention is, therefore, a process for the manufacture of azo dyestuffs comprising the steps of diazotizing an o-amino-diacyl-amino compound of the aromatic series of the above cited constitution, coupling it with such a coupling component of the aliphatic, aromatic or heterocyclic series containing at least one hydroxy, alkoxy, carboxy, amino, alkylamino, aralkylamino or arylamino group and being able to couple with the diazo compound in an ortho-position to the above said groups, and subjecting the diacylamino-azo dyestuff thus obtained to a treatment with saponifying agents in order to eliminate one of the acyl groups.

Still another object of the present invention are the azo dyestuffs of the general formula

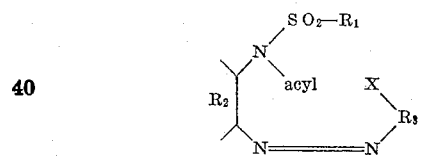

wherein $R_1$ represents alkyl, aryl and aralkyl, $R_2$ represents a radical of an aromatic or heterocyclic compound, $R_3$ represents a radical of an aromatic, aliphatic or heterocyclic compound, and X represents a group contiguous to the azo group and selected from the class consisting of hydroxy, alkoxy, carboxy, amino, alkylamino, aralkylamino and arylamino groups.

Still another object of the present invention are the azo dyestuffs of the general formula

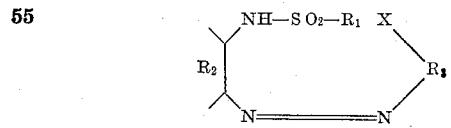

wherein $R_1$ represents alkyl, aryl and aralkyl, $R_2$ represents a radical of an aromatic compound, $R_3$ represents a radical of an aromatic, aliphatic or heterocyclic compound, and X represents a group contiguous to the azo group and selected from the class consisting of hydroxy, alkoxy, carboxy, amino, alkylamino, aralkylamino and arylamino groups.

Still another object of the present invention is a process for dyeing textile fibres and leather fast tints, consisting in dyeing the textile fibres with monoacylaminoazo dyestuffs and aftertreating the dyeings thus obtained with compounds yielding chromium or copper, preferably in presence of acids.

*Example 1*

43 parts of 2-di-p-toluenesulphamino-5-methyl-1-aminobenzene are diazotized in the usual manner with 6.9 parts of sodium nitrite and 25 parts of hydrochloric acid and coupled in presence of sodium carbonate with 25.6 parts of 4'-sulphophenylmethylpyrazolone. After the coupling has occurred, the precipitated dyestuff, which is difficultly soluble in water is filtered, pasted with some water and heated up to 90° C. with a 5% aqueous solution of caustic soda. During this treatment the dyestuff goes in solution and the elimination of a p-toluene-sulpho radical has soon occurred. The reaction mixture is then cooled down, neutralized with hydrochloric acid and the precipitated dyestuff filtered and dried.

In the dry form it is a yellow powder, dyeing wool from an acid bath yellow shades, which become transformed by afterchroming into a brownish-red.

By using in this example instead of 4'-sulphophenylmethylpyrazolone other sulphonated or carboxylated pyrazolone derivatives, similar products will be obtained, for instance when 2', 5'-dichloro-4'-sulphophenylmethylpyrazolone is employed, a dyestuff will be obtained, which dyes wool from an acid bath greenish-yellow shades.

By using as coupling component the Neville-Winther acid instead of the pyrazolone a dyestuff will be obtained, which is a red powder, dyeing wool orange-red shades, which become violet on after-chroming.

Similar tints will be obtained with dyestuffs prepared from other naphtholmonosulphonic acids such as 1, 5-naphtholsulphonic acid, 1, 3-naphtholsulphonic acid, 2, 6-naphtholsulphonic acid and 2, 5-naphtholsulphonic acid.

*Example 2*

43 parts of 2-di-p-toluenesulphamino-5-methyl-1-aminobenzene are diazotized in the usual manner and coupled in presence of sodium carbonate with 30.4 parts of 1-naphthol-3, 6-disulphonic acid. The dyestuff thus obtained is then saponified as described in Example 1 and isolated. In dry state it is a violet powder dyeing wool from an acid bath orange shades, which become transformed into violet on after-chroming.

*Example 3*

31.8 parts of 2-acetyl-p-toluenesulphamino-5-methyl-1-aminobenzene of the formula

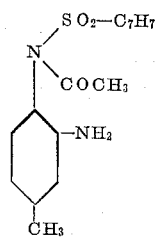

are diazotized in the usual manner and coupled in presence of sodium carbonate with 1,-4-naphtholmonosulphonic acid. After the coupling has occurred, 25 parts of caustic soda lye are added to the solution and the whole is heated during one hour at about 90° C., whereby the saponification of the acetyl group takes place. The solution is then neutralized with acid and the dyestuff isolated and dried. It is a red powder, dyeing wool from an acid bath orange-red shades. By after-chroming violet tints will be obtained. The dyestuff prepared according to the present example is identical with the dyestuff obtained according to Example 1 from 2-di-p-toluene-sulphamino-5-methyl-1-aminobenzene and 1,4-naphtholmonosulphonic acid.

*Example 4*

45 parts of 2-di-p-toluenesulphamino-5-chloro-1-aminobenzene are diazotized in the usual manner and coupled with 22.4 parts of 2-naphthol-6-sulphonic acid. The saponification of the dyestuff thus prepared is carried out in the manner described in Example 1 and the dyestuff isolated and dried. It is a dark powder dyeing wool orange-brown shades which are transformed into violet by after-chroming and into red shades on treatment with copper salts.

*Example 5*

45 parts of 2-di-p-toluenesulphamino-5-chloro-1-aminobenzene are diazotized and coupled with 30.4 parts of 2-naphthol-6,8-disulphonic acid in presence of sodium carbonate. After saponification in the manner above described and isolation, a red powder, dyeing wool orange shades, which become red-violet by after-chroming, will be obtained.

*Example 6*

17.3 parts of sulphanilic acid are diazotized and coupled in the usual manner with 11 parts of resorcinol in presence of sodium carbonate. The monoazo-dyestuff thus obtained is then combined with a diazo compound prepared from 45 parts of 2-di-p-toluenesulphamino-5-chloro-1-aminobenzene and the disazo dyestuff thus produced is saponified as above described and isolated. It is a brown powder, dyeing wool from an acid bath orange-brown shades, which are transformed into brown by after-chroming.

This diazo dyestuff can easily be transformed into its chromium complex compound by treating it with chromium yielding substances. The metalliferous dyestuff thus obtained dyes wool brown shades.

*Example 7*

49.6 parts of 2-di-p-toluenesulphamino-1-amino-benzene-5-sulphonic acid are diazotized in the usual manner and coupled with 14.4 parts of β-naphthol in presence of sodium carbonate. The saponification of the dyestuff thus obtained is then carried out as above described and the dyestuff isolated. It is a red powder, dyeing wool brown-red shades. By after-chroming the same become transformed into violet shades.

*Example 8*

49.6 parts of 2-di-p-toluenesulphamino-1-amino-benzene-5-sulphonic acid are diazotized in the usual manner and coupled in presence of sodium carbonate with 10.8 parts of m-phenylenediamine. The saponification and isolation of the dyestuff is then carried out as above described, whereby a red-brown powder, dyeing wool orange shades, is obtained. By after-chroming brown shades are obtained.

By coupling of the above diazo compound with phenylmethylpyrazolone and saponification of the mono-azo dyestuff, a yellow powder dyeing wool yellow shades, which become orange on after-chroming, will be obtained.

*Example 9*

37.5 parts of the compound of the formula

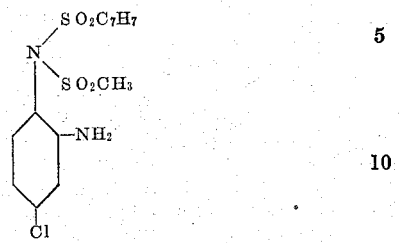

are diazotized and coupled in presence of soda with 22.4 parts of 1,4-naphtholsulphonic acid. By heating the monoazo dyestuff thus obtained in soda-alkaline mother-liquor, the saponification occurs and the dyestuff can be precipitated by acidulation of the solution. In this manner, a red powder dyeing wool orange-red shades, that become violet by after-chroming, will be obtained.

*Example 10*

29.2 parts of the compound of the formula

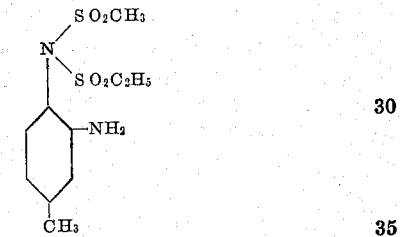

are diazotized in the usual manner and coupled in presence of sodium carbonate with 25.6 parts of 4'-sulphophenylmethylpyrazolone. The saponification and isolation of the dyestuff can be carried out in a manner described above, whereby a yellow powder, dyeing wool yellow shades, that become orange on after-chroming, will be obtained.

*Example 11*

18.4 parts of benzidine are tetrazotized in the usual way and coupled in presence of sodium carbonate with 13.8 parts of salicylic acid. The intermediate product thus obtained is then combined in presence of alkali with the saponified monoazo dyestuff prepared from 49.6 parts of 2-di-p-toluenesulphamino-1-aminobenzene-5-sulphonic acid and 11 parts of resorcinol, and the trisazo dyestuff thereby produced is isolated in a usual manner.

The same dyestuff can be prepared by coupling the intermediate product obtained from benzidine and salicylic acid, with the non-saponified monoazo compound prepared from 2-di-p-toluenesulphamino-1-aminobenzene-5-sulphonic acid and resorcin, and subjecting the trisazodyestuff to a saponification process.

In dry state the dyestuff is a dark powder, dyeing cotton and regenerated cellulose brown shades, which become darker when aftertreated with copper salts. The complex copper compound of this dyestuff can easily be produced in substance by treating the dyestuff with copper yielding compounds. The complex copper compound is a water soluble dark powder, dyeing cotton, regenerated cellulose and natural silk brown shades.

*Example 12*

43 parts of 2-di-p-toluenesulphamino-5-methyl-1-aminobenzene are diazotized and coupled in presence of sodium carbonate with 28.3 parts of 1-(2'-methyl-3'-amino-5'-sulphophenyl)-3-methyl-5-pyrazolone. After saponification and isolation a yellow powder is obtained, dyeing wool yellow shades which become orange when after-chromed.

The monoazo dyestuff thus obtained can further be diazotized and coupled with any coupling component to give disazo dyestuffs. The coupling product with 1-hydroxynaphthalene-4-sulphonic acid is an orange brown powder, dyeing wool orange-red shades, which become brownish-red by after-chroming. The same dyestuff will be obtained if the non-saponified monoazo dyestuff is coupled with 1-hydroxynaphthalene-4-sulphonic acid and subjected to saponification.

If one uses instead of 1-hydroxynaphthalene-4-sulphonic acid, the equivalent quantity of 2'-5'-dichloro-4'-sulpho-1-phenyl-5-pyrazolone, a disazo dyestuff will be obtained, which is an orange-brown powder dyeing wool yellow shades, which become brown-orange by after-chroming.

The following table illustrates further examples of dyestuffs with their respective shades:

*Monoazo dyestuffs*

| Diazo component | Coupling component | Dry powder | After saponification shade on wool | |
|---|---|---|---|---|
| | | | Direct | After-chromed |
| 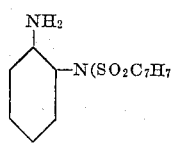 | 1-naphthol-4-sulphonic acid | Violet | Orange-red | Violet. |
| 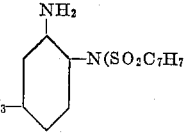 | 4'-sulpho-phenylmethyl-pyrazolone | Yellow | Yellow | Brownish-red. |
| Do | 2',5'-dichloro-4'-sulphophenyl-methyl-pyrazolone. | do | do | Brownish-orange. |
| Do | 1,4-naphthol-sulphonic acid | Red | Orange-red | Violet. |
| Do | 1-naphthol-3,6-disulphonic acid | Violet | Orange | Violet. |
| Do | 1-(2'-methyl-3'-amino-5'-sulphophenyl)-3-methyl-5-pyrazolone. | Yellow | Yellow | Orange. |
| Do | 2-amino-8-naphthol-6-sulphonic acid | Dark-brown | Bluish-red | Dark-blue. |
| 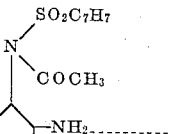 | 1,4-naphthol-sulphonic acid | Red | Orange-red | Violet. |
| 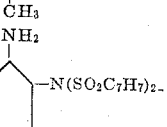 | 2-naphthol-6-sulphonic acid | Dark | Orange-brown | Violet. |
| Do | 2-naphthol-6,8-disulphonic acid | Red | Orange | Red-violet. |
| Do | 1-hydroxy-8-phenylamino-napthalene-5-sulphonic acid. | Dark | Violet | Dark-green. |
| Do | 1-naphthol-4-sulphonic acid | Red | Orange-red | Bluish-violet. |
| Do | 4'-sulphophenyl-methylpyrazolone | Yellow | Yellow | Brownish-red. |
| 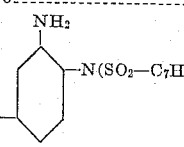 | β-naphthol | Red | Brown-red | Violet. |
| Do | m-phenylene-diamine | Red-brown | Orange | Brown. |
| Do | Phenylmethyl-pyrazolone | Yellow | Yellow | Orange. |
| Do | Resorcinol | Orange-brown | Yellow | Brown-red. |
| Do | p-cresol | Yellow | Reddish-yellow | Corinth. |
| Do | N-acetyl-p-aminophenol | Yellow | Brownish-yellow | Violet-brown. |
| Do | 1-acetylamino-7-naphthol | Brownish-violet | Brownish-red | Black-blue. |
| Do | Acetoacetic anilide | Yellow | Yellow | Yellow. |
| 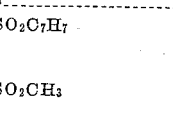 | 1-naphthol-4-sulphonic acid | Red | Orange-red | Violet. |

| Diazo component | Coupling component | Dry powder | After saponification shade on wool | |
|---|---|---|---|---|
| | | | Direct | After-chromed |
| Do. | 2-naphthol-4-sulphonic acid | Dark | Orange-brown | Brownish-violet. |
| (phenyl with N(SO₂CH₃)(SO₂C₂H₅), NH₂, CH₃) | 4-sulphophenylmethylpyrazolone | Yellow | Yellow | Orange. |
| (phenyl with NH₂, N(SO₂C₇H₇)₂, CH₃, NO₂) | 1-naphthol-4-sulphonic acid | Red | Yellowish-red | Navy-blue. |
| (naphthyl with NH₂, N(SO₂C₇H₇)₂) | 1-naphthol-4-sulphonic acid | Dark | Bluish-red | Black-blue. |
| (naphthyl with NH₂, N(SO₂C₇H₇)₂, SO₃H) | β-naphthol | Dark | Red | Grey-blue. |

Polyazo dyestuffs

| Diazo component | Coupling component | Dry powder | After saponification shade on wool | |
|---|---|---|---|---|
| | | | Direct | After-chromed |
| (phenyl with N(SO₂C₇H₇)₂, NH₂, Cl) | →resorcinol←sulphanilic acid | Brown | Orange-brown | Brown. |
| (phenyl with NH₂, N(SO₂C₇H₇)₂, SO₃H) | →resorcinol→ | Dark | Yellow-brown | Violet-red-brown. |
| Do. | →m-phenylene-diamine ← 4-nitro-2-amino-1-phenol. | Dark | Reddish-brown | Dark-brown. |
| (phenyl with NH₂, N(SO₂C₇H₇)₂, CH₃, NH₂) | →2 mols of 1-naphthol-4-sulphonic acid | Red | Bluish-red | Violet. |
| (phenyl with NH₂, N(SO₂C₇H₇)₂, CH₃, NH₂) | 2 mols of 1-phenylamino-8-naphthol-4-sulphonic acid. | Dark | Dark-blue | Green. |
| (phenyl with NH₂, N(SO₂C₇H₇)₂, CH₃) | →1-(2'-methyl-3'-amino-5'-sulpho-phenyl)-3-methyl-5-pyrazolone. → 1-naphthol-4-sulphonic acid. | Orange-brown | Orange-red | Brownish-red. |

| Diazo component | Coupling component | | Dry powder | After saponification shade on wool | |
|---|---|---|---|---|---|
| | | | | Direct | After-chromed |
| CH₃—⌬(NH₂)—N(SO₂C₇H₇)₂ | →1-(2'-methyl-3'-amino-5'-sulphophenyl)-3-methyl-5-pyrazolone. | → 2',5'-dichloro-4'-sulpho-1-phenyl-3-methylpyrazolone. | Orange-brown | Yellow | Brown-orange. |

| Diazo component | Coupling component | |
|---|---|---|
| [SO₃H—⌬(NH₂)—N(SO₂C₇H₇)₂]₂ | →resorcinol ←dianisidine | Dark powder, on cotton violet-brown, aftertreated with copper-salts reddish brown. |
| SO₃H—⌬(NH₂)—N(SO₂C₇H₇)₂ | →resorcinol←benzidine→salicylic acid | Dark powder, orange-brown on cotton, browner with copper-salts. |
| Do | →2-amino-5-hydroxy←benzidine→salicylic acid. naphthalene-7-sulphonic acid. | Dark-brown powder, reddish-brown on cotton, browner with copper-salts. |
| Do | →resorcinol←amidoazo-toluene-monosulphonic acid. | Dark powder, on leather; reddish-brown, the complex copper-compound on leather brown. |
| Do | →resorcinol←1-amino-8-hydroxy-naphthalene-3:6-disulphonic acid. | Black powder, on leather: brown, coppercomplex: violet-brown. |

What I claim is:—

1. A process for the manufacture of azo dyestuffs capable of forming complex metal compounds, comprising coupling a diazo compound prepared from an amine of the aromatic series and containing in the ortho position to the diazotizable amino group at least one group of the general formula $$-N\diagdown_{acyl}^{Z}$$

wherein Z represents a group selected from the class consisting of sulphoalkyl, sulphoaryl and sulphoaralkyl groups and acyl represents an acid radical selected from the class consisting of aliphatic and aromatic carboxylic and sulphonic acid radicals, with a coupling component selected from the class consisting of pyrazolones and aromatic compounds of the benzene and naphthalene series containing at least one group selected from the class consisting of hydroxy, alkoxy, amino, alkylamino, aralkylamino and arylamino groups and capable of coupling with the diazo compounds in an ortho position to one of these groups, and subjecting the azo dyestuffs thus obtained to a treatment with an alkali in presence of water in order to eliminate the acyl group.

2. A process for the manufacture of azo dyestuffs capable of forming complex metal compounds, comprising coupling a diazo compound prepared from an amine of the general formula

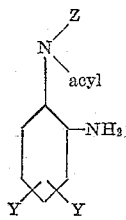

wherein Y represents a substituent selected from the class consisting of hydrogen, halogen, alkyl, alkoxy, nitro, sulpho, and amino groups, Z represents a group selected from the class consisting of sulphoalkyl, sulphoaryl and sulphoaralkyl groups and acyl represents an acid radical selected from the class consisting of aliphatic and aromatic carboxylic and sulphonic acid radicals, with a coupling component selected from the class consisting of pyrazolones and aromatic compounds of the benzene and naphthalene series containing at least one group selected from the class consisting of hydroxy, alkoxy, amino, alkylamino, aralkylamino and arylamino groups and capable of coupling with the diazo compounds in an ortho position to one of these groups, and subjecting the azo dyestuff thus obtained to a treatment with an alkali in presence of water in order to eliminate the acyl group.

3. A process for the manufacture of azo dyestuffs capable of forming complex metal compounds, comprising coupling a diazo compound prepared from an amine of the general formula

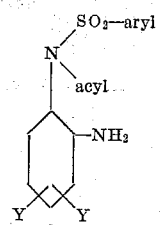

wherein Y represents a substituent selected from the class consisting of hydrogen, halogen, alkyl, alkoxy, nitro, sulpho, and amino groups and acyl represents an acid radical selected from the class consisting of aliphatic and aromatic carboxylic and sulphonic acid radicals, with a coupling component selected from the class consisting of pyrazolones and aromatic compounds of the benzene and naphthalene series containing at least one group selected from the class consisting of hydroxy, alkoxy, amino, alkylamino, aralkylamino and arylamino groups and capable of coupling with the diazo compounds in an ortho position to one of these groups, and subjecting the azo dyestuff thus obtained to a treatment with an alkali in presence of water in order to eliminate the acyl group.

4. A process for the manufacture of azo dyestuffs capable of forming complex metal compounds, comprising coupling a diazo compound prepared from an amine of the general formula

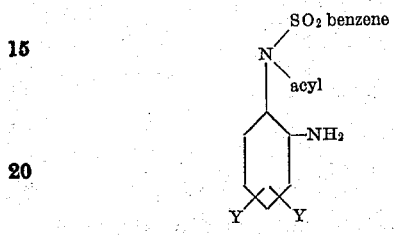

wherein Y represents a substituent selected from the class consisting of hydrogen, halogen, alkyl, alkoxy, nitro, sulpho, and amino groups and acyl represents an acid radical selected from the class consisting of aliphatic and aromatic carboxylic and sulphonic acid radicals, with a coupling component selected from the class consisting of pyrazolones and aromatic compounds of the benzene and naphthalene series containing at least one group selected from the class consisting of hydroxy, alkoxy, amino, alkylamino, aralkylamino and arylamino groups and capable of coupling with the diazo compounds in an ortho position to one of these groups, and subjecting the azo dyestuff thus obtained to a treatment with an alkali in presence of water in order to eliminate the acyl group.

5. A process for the manufacture of azo dyestuffs capable of forming complex metal compounds, comprising coupling a diazo compound prepared from an amine of the general formula

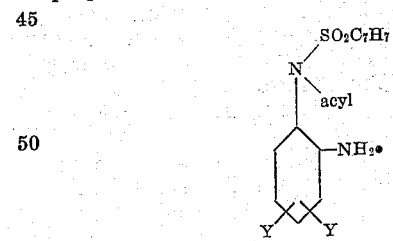

wherein Y represents a substituent selected from the class consisting of hydrogen, halogen, alkyl, alkoxy, nitro, sulpho, and amino groups and acyl represents an acid radical selected from the class consisting of aliphatic and aromatic carboxylic and sulphonic acid radicals, with a coupling component selected from the class consisting of pyrazolones and aromatic compounds of the benzene and naphthalene series containing at least one group selected from the class consisting of hydroxy, alkoxy, amino, alkylamino, aralkylamino and arylamino groups and capable of coupling with the diazo compounds in an ortho position to one of these groups, and subjecting the azo dyestuff thus obtained to a treatment with an alkali in presence of water in order to eliminate the acyl group.

6. A process for the manufacture of azo dyestuffs capable of forming complex metal compounds, comprising coupling a diazo compound prepared from an amine of the general formula

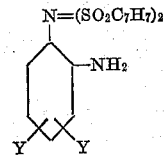

wherein Y represents a substituent selected from the class consisting of hydrogen, halogen, alkyl, alkoxy, nitro, sulpho, and amino groups, with a coupling component selected from the class consisting of pyrazolones and aromatic compounds of the benzene and naphthalene series containing at least one group selected from the class consisting of hydroxy, alkoxy, amino, alkylamino, aralkylamino and arylamino groups and capable of coupling with the diazo compounds in an ortho position to one of these groups, and subjecting the azo dyestuff thus obtained to a treatment with an alkali in presence of water in order to eliminate one sulphotolyl group.

7. A process for the manufacture of an azo dyestuff, comprising diazotizing the o-amino-diacylamino-compound of the formula

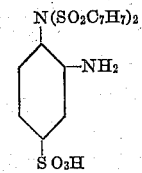

coupling same with 1-acetyplamino-7-hydroxy-naphthalene and treating the dyestuff thus obtained with an aqueous alkali solution in order to to eliminate one sulphotolyl group.

8. A process for the manufacture of an azo dyestuff, comprising diazotizing the o-amino-diacylamino compound of the formula

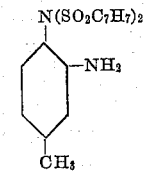

coupling same with 1-hydroxynaphthalene-4-sulphonic acid and treating the dyestuff thus obtained with an aqueous alkali solution in order to eliminate one sulphotolyl group.

9. Azo dyestuffs containing in their molecule at least one sulpho group and at least one group of the general formula

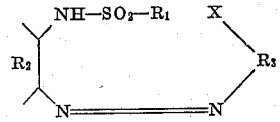

wherein $R_1$ represents a group selected from the class consisting of alkyl, aryl and aralkyl groups, $R_2$ represents a radical of an aromatic compound, $R_3$ represents a radical selected from the class consisting of radicals of pyrazolones and aromatic compounds of the benzene and naphthalene series, and X represents a substituent contiguous to the azo group and selected from the class consisting of hydroxy, alkoxy, amino, alkylamino, arylamino and aralkylamino groups, which dyestuffs are in dry state yellow to dark powders, dyeing textile fibres yellow to black shades and which are capable of yielding complex metal compounds useful for dyeing purposes.

10. Azo dyestuffs containing in their molecule at least one sulpho group and at least one group of the general formula

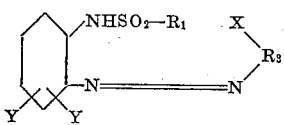

wherein Y represents a substituent selected from the class consisting of hydrogen, alkyl, alkoxy, halogen, nitro, sulpho, amino, alkylamino, arylamino and aralkylamino groups, R₁ represents a group selected from the class consisting of alkyl, aryl and aralkyl groups, R₃ represents a radical selected from the class consisting of radicals of pyrazolones, and aromatic compounds of the benzene and naphthalene series, X represents a substituent contiguous to the azo group and selected from the class consisting of hydroxy, alkoxy, amino, alkylamino, arylamino and aralkylamino groups, which dyestuffs are in dry state yellow to dark powders, dyeing textile fibres yellow to black shades and which are capable of yielding complex metal compounds useful for dyeing purposes.

11. Azo dyestuffs containing in their molecule at least one sulpho group and at least one group of the general formula

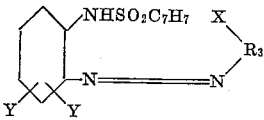

wherein Y represents a substituent selected from the class consisting of hydrogen, alkyl, alkoxy, halogen, nitro, sulpho, amino, alkylamino, arylamino and aralkylamino groups, R₃ represents a radical selected from the class consisting of radicals of pyrazolones and aromatic compounds of the benzene and naphthalene series, and X represents a substituent contiguous to the azo group and selected from the class consisting of hydroxy, alkoxy, amino, alkylamino, arylamino and aralkylamino groups, which dyestuffs are in dry state yellow to dark powders, dyeing textile fibres yellow to black shades and which are capable of yielding complex metal compounds useful for dyeing purposes.

12. The azo dyestuff of the formula

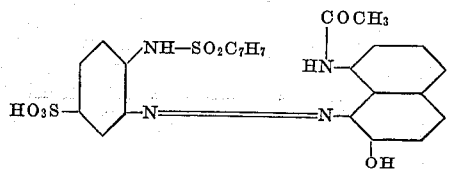

which is in dry state a brownish-violet powder, dyeing wool brownish-violet shades which become black-blue when afterchromed.

13. The azo dyestuff of the formula

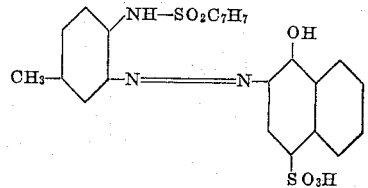

which is in dry state a red powder, dyeing wool orange-red shades which become violet when afterchromed.

14. The azo dyestuff of the formula

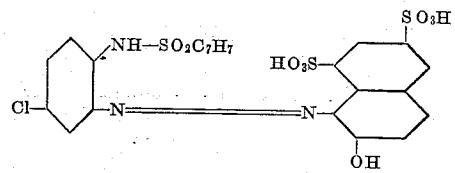

which is in dry state a red powder, dyeing wool orange shades which become red-violet when afterchromed.

15. A process for the manufacture of an azo dyestuff, comprising diazotizing the o-aminodiacylamino-compound of the formula

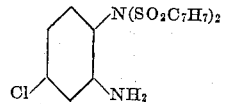

coupling same with 2-hydroxynaphthalene-6:8-disulphonic acid and treating the dyestuff thus obtained with an aqueous alkali solution in order to eliminate one sulphotolyl group.

WALTER WEHRLI.